United States Patent
Fuchs et al.

(10) Patent No.: US 6,570,957 B2
(45) Date of Patent: May 27, 2003

(54) X-RAY DIAGNOSTIC APPARATUS HAVING A STORAGE LUMINESCENT SCREEN

(75) Inventors: Manfred Fuchs, Nuremberg (DE); Erich Hell, Erlangen (DE); Detlef Mattern, Erlangen (DE)

(73) Assignee: Siemens Aktiengesellschaft, Münich (DE)

( * ) Notice: Subject to any disclaimer, the term of this patent is extended or adjusted under 35 U.S.C. 154(b) by 0 days.

(21) Appl. No.: 10/162,860

(22) Filed: Jun. 4, 2002

(65) Prior Publication Data

US 2003/0002623 A1 Jan. 2, 2003

Related U.S. Application Data

(63) Continuation of application No. 09/676,456, filed on Sep. 29, 2000, now abandoned.

(30) Foreign Application Priority Data

Sep. 29, 1999 (DE) .......................................... 199 46 743

(51) Int. Cl.[7] ................................................. H05G 1/64
(52) U.S. Cl. ...................... 378/98.2; 378/98.5; 378/98.8
(58) Field of Search ........................ 378/91, 98.2, 98.5, 378/98.8; 250/587

(56) References Cited

U.S. PATENT DOCUMENTS

| | | | |
|---|---|---|---|
| 4,587,036 A | 5/1986 | Degenhardt | 252/301.4 H |
| 5,049,749 A | 9/1991 | Lange et al. | 250/584 |
| 5,998,802 A | 12/1999 | Struye et al. | 250/584 |
| 6,025,601 A | 2/2000 | Trulson et al. | 250/461.2 |
| 6,310,357 B1 * | 10/2001 | Fuchs et al. | 250/587 |
| 6,324,249 B1 * | 11/2001 | Fazzio | 378/22 |

FOREIGN PATENT DOCUMENTS

DE   OS 38 03 766   8/1989

\* cited by examiner

*Primary Examiner*—Drew A. Dunn
*Assistant Examiner*—Theresa Barber
(74) *Attorney, Agent, or Firm*—Schiff Hardin & Waite

(57) ABSTRACT

An X-ray diagnostic apparatus has a luminescent storage screen for the latent storage of an X-ray image, an X-ray exposure apparatus for producing an X-ray beam, a readout apparatus system with which the storage luminescent screen is excited to luminescence by scanning with a source of radiation, a detector for the acquisition of the light emitted by the storage luminescent screen, and an image playback system. For the scanning, the storage luminescent screen is guided through an opening of a rectangular supporting structure and is held in the scanning region by air bearings attached to the supporting structure on both sides of the opening. A line-shaped source of stimulation radiation and a line-shaped light detector are mounted to the supporting structure.

17 Claims, 2 Drawing Sheets

X-RAY DIAGNOSTIC APPARATUS HAVING A STORAGE LUMINESCENT SCREEN

This application is a continuation of application Ser. No. 09/676,456 filed Sep. 29, 2000, now abandoned.

BACKGROUND OF THE INVENTION

1. Field of the Invention

The present invention relates to an X-ray diagnostic apparatus of the type having a storage luminescent screen for the latent storage of the respective X-ray image, having an X-ray exposure apparatus for producing an X-ray beam, a readout apparatus system with which, for the reproduction of an image, the storage luminescent screen is excited to luminescence by a scanning with a source of radiation, a detector for the acquisition of the light emitted by the storage luminescent screen, and an image reproduction system.

2. Description of the Prior Art

German OS 38 03 766, discloses an X-ray diagnostic apparatus of this type in which, as a radiation-sensitive converter, a storage luminophore is irradiated with X-rays so that unbonded electrons are produced therein that are stored in potential traps. With a readout system, the entire surface of this storage luminescent screen is scanned pixel-by-pixel by an additional source of radiation, for example a laser, so that the electrons stored in the traps are excited and can fall back into recombination centers, whereby the energy differential is radiated in the form of light quanta. In this way, it is possible to read out the stored X-ray image from the storage luminescent screen.

For the planiform scanning of the storage luminescent screen, a laser beam of the type known as a flying spot scanner is deflected by two mirrors in the vertical and horizontal directions, so that all pixels located on the storage luminescent screen can be scanned one after the other. The light emitted by the storage luminescent screen is acquired by two light-guiding plates, and is guided to two laterally attached line-shaped CCD light converters. The output signal of the detector is supplied to a conventional video chain for the reproduction of the X-ray image on a monitor.

In this context, barium fluoride-bromium chloride compounds activated with europium that are known from German OS 33 47 207 and that can be excited by visible light (photostimulation), can be used as storage luminophores. A He—Ne laser, is usually employed which produces radiation having a wavelength of 633 nm.

From European Application 859 244, an X-ray diagnostic apparatus is known in which the plates of the storage luminescent screens are read out with CCD lines instead of a flying spot scanner. These lines are very sensitive to the exact maintenance and reproducibility of the distance between the layer to be read out and the line-shaped CCD detector. The larger the numerical aperture of the light collector (for example a fiber-optic plate), the more strongly distance variations are noticeable, as causing a worsening of the modulation transmission function (MTF).

In flying spot scanners, the storage luminophore film or foil can be held without difficulty on a flat base by vacuum suction, because the stimulation and reading out are carried out from the same side. In the case of a CCD line readout arrangement, this is generally not possible, due to the limitations imposed by the aperture. If a correspondingly large glass plate were supported only at the edges (which would allow readout and stimulation), the gravitational deformation would be approximately 50 $\mu$m, however, a deflection of this sort leads to an undesirable reduction of the MTF.

SUMMARY OF THE INVENTION

An object of the present invention is to provide an X-ray diagnostic of the type described above that avoids, or at least significantly reduces, bendings [or deflections of the plate of the storage luminescent screen, without damaging the imaging layer containing the storage luminophore.

The object is inventively achieved in an X-ray diagnostic apparatus wherein, for scanning the storage luminophore, the screen is guided through access or an opening of a supporting structure having a rectangular cross-section, and is held in the scanning region by air bearings attached to the supporting structure on both sides of the opening, and wherein a line-shaped radiation source for stimulation radiation and a line-shaped light detector are mounted at the supporting structure. Due to the use of air bearings having small distance tolerances, no friction arises that could hinder the scanning process and damage the layer surface, so that the storage luminescent screen can be accurately held in the scanning region.

In an embodiment of the invention, the line-shaped radiation source can be attached to the supporting structure on the one side of the opening, and the line-shaped detector can be attached to the supporting structure on the other side of the opening.

It has proven advantageous for two air bearings to be provided on each of the sides at which the line-shaped radiation source and the line-shaped detector are respectively disposed.

The line-shaped source of radiation can be a photodiode array, and the line-shaped detector can be a CCD light converter.

In order to accommodate the weight of the storage luminescent screen with minimal shape deformation, the supporting structure can be realized as a frame that is resistant to bending.

The air bearings can inventively operate at 5.5 bar excess (i.e., above atmospheric) pressure, with gap widths of 6±1 $\mu$m.

Deflection of the storage luminescent screen is optimally prevented in an embodiment wherein the air bearings are arranged such that they have a distance from the edge of the storage luminescent screen that corresponds to one-fourth of the width of the storage luminescent screen, or so that they divide the width of the scanning region into three regions of equal size.

DESCRIPTION OF THE PREFERRED EMBODIMENTS

Figure 1:
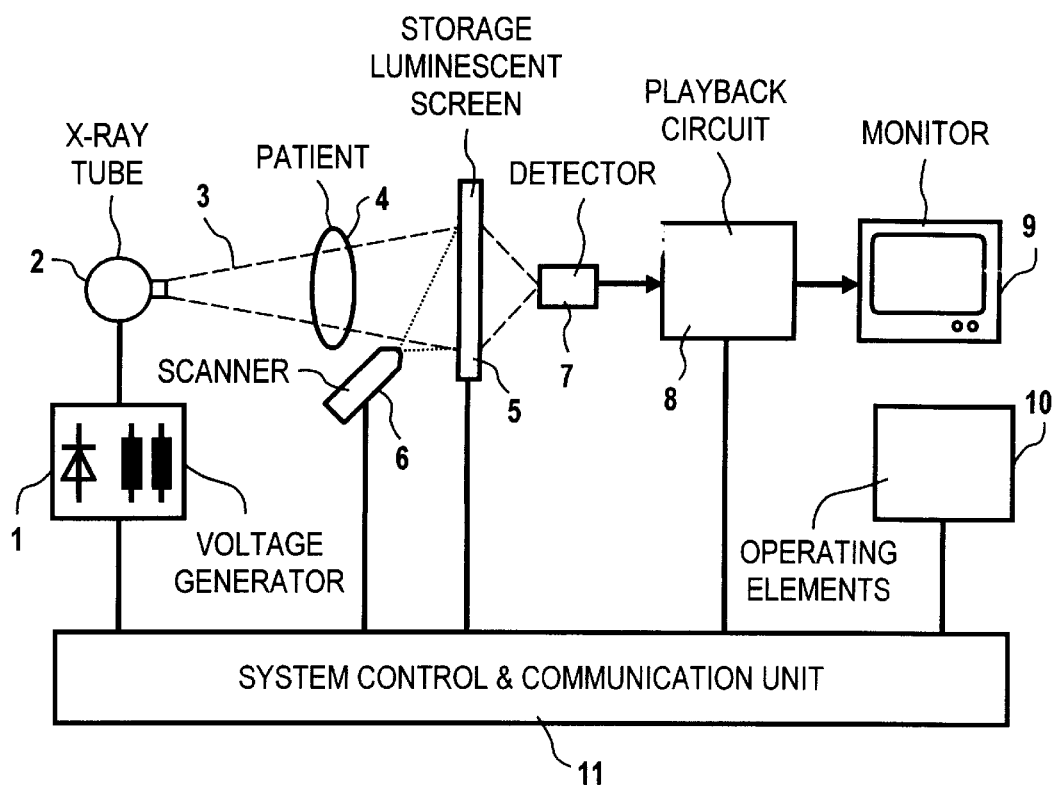
FIG. 1 shows a known X-ray diagnostic apparatus, in which the invention is employed.

FIG. 1 shows an X-ray diagnostic apparatus having an X-ray tube 2 supplied by a voltage generator 1 with high voltage and heating voltage for a thermionic cathode, the tube 2 producing a cone-shaped X-ray beam 3 that penetrates a patient 4. The X-rays, attenuated by the patient 4 corresponding to the patient's transparency, strike a storage luminescent screen 5. As already described, this incident radiation image produces unbonded electrons in the storage luminescent screen 5 that are stored in potential traps of the storage luminophore, so that a latent image is stored in the storage luminescent screen 5.

For the reproduction (readout) of the latent stored image, the storage luminescent screen 5 is excited line-by-line by a scanner 6. A detector 7 acquires the light emitted by the storage luminescent screen 5, and converts the light corresponding to the brightness of the scanned pixels into an electrical signal that is supplied to a playback circuit 8, which produces, from the individual analog output signals of the detector 7, a video signal for representation on a monitor 9. The playback circuit 8 can include a video chain having converters, image storage means (memories), and processing circuits. Operating elements 10 are connected with the remaining components of the X-ray diagnostic apparatus via a system control and communication unit 11. The system control and communication unit controls and synchronizes the voltage generator 1, the relative motion of the storage luminescent screen 5, the scanner 6, the playback circuit 8, and the monitor 9.

Figure 2:
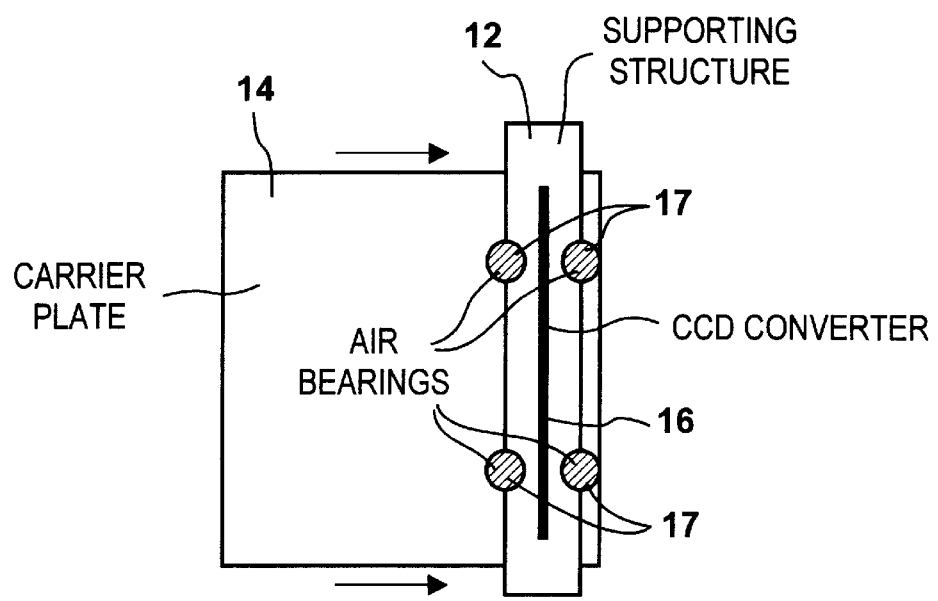
FIG. 2 shows a top view of an inventive scanning apparatus.
Figure 3:
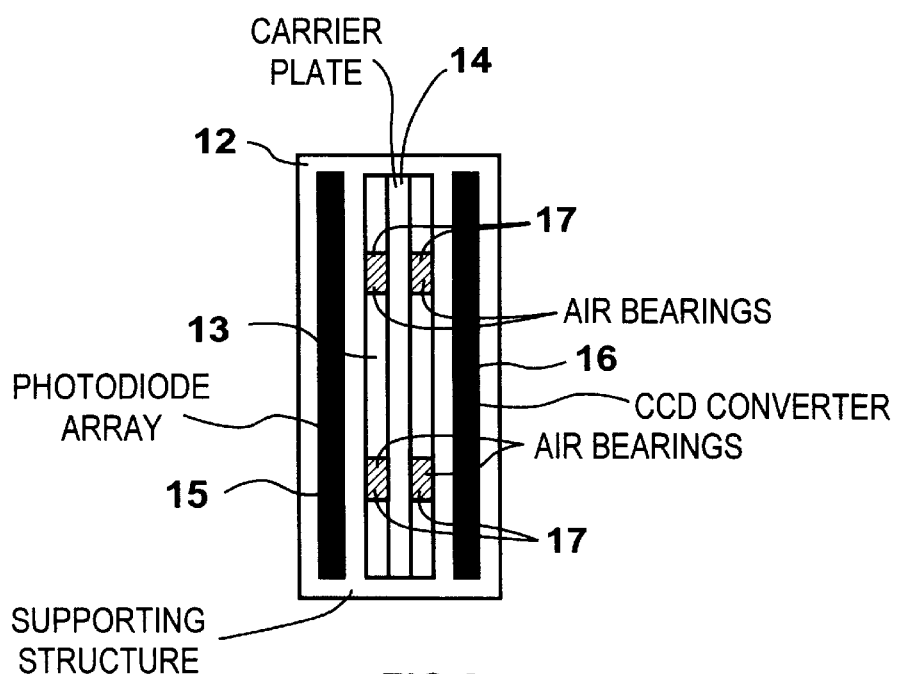
FIG. 3 shows the scanning apparatus according to FIG. 2 in cross-section.

FIG. 2 shows a top view of the inventive scanner 6 for the plate-shaped storage luminescent screen 5, which for example has a carrier plate 14 made of glass. A support structure 12 having a rectangular cross-section and having an opening 13 that is visible in FIG. 3, encompasses the carrier plate 14 of the storage luminescent screen 5. On the side located underneath the carrier plate 14, a photodiode array 15 is attached as a line-shaped source of stimulation radiation, and above the carrier plate 14 a CCD light converter 16 is attached to the support structure 12 as a line-shaped light detector 7. Two air bearings 17 are attached to the support structure 12 at each side, laterally to the line-shaped photodiode array 15 and laterally to the line-shaped CCD light converter 16. The air bearings are arranged such that they have a distance from the edge of the storage luminescent screen 5 that corresponds approximately to one-fourth of the width of the storage luminescent screen 5. In this way, the four air bearings 17 arranged on the side of the support structure 12 can be disposed to define a rectangle whose length corresponds to half the width of the storage luminescent screen 5 and whose width corresponds, for example, to twice the width of the line-shaped photodiode array 15, or twice the width of the line-shaped CCD light converter 16.

Alternatively, the air bearings 17 can be arranged such that they divide the width of the scanning region into three regions of equal size. More than eight air bearings 17 can be provided.

Since, during the CCD line readout, stimulation takes place by means of transmitted light, a head is guided over the entire width of the imaging plate of the storage luminescent screen 5 on both sides of the transparent carrier plate 14, which is, for example, made of glass. The line-shaped stimulation light source and the photodiode array 15 are guided on the underside of the glass carrier plate 14, and the CCD line 16 is guided on the upper side. The CCD and light source support structure 12 is fashioned as a frame that is resistant to bending, in order to enable the weight of the glass carrier 14 to be held with minimal shape deformation. Transmission of force takes place via the air bearings 17 arranged on both sides. These operate, for example, at 5.5 bar excess pressure, with gap widths of 6±1 $\mu$m. The distance tolerances are thereby very small, and no friction arises that could hinder the scanning process and damage the layer surface. Moreover, the trueness of the shape of the layer carrier, and thus the resolution of the detector, are maximally independent of position. This is a property that is of the greatest importance for applications in medical X-ray technology.

Instead of the above-described scanning with transmitted light, the air bearings 17 can be used in an arrangement in which stimulation and reading out of the storage luminescent screen 5 take place from the same side.

Although modifications and changes may be suggested by those skilled in the art, it is the intention of the inventors to embody within the patent warranted hereon all changes and modifications as reasonably and properly come within the scope of their contribution to the art.

We claim as our invention:

1. An X-ray diagnostic apparatus comprising:

an X-ray source which emits an X-ray beam;

a storage luminescent screen on which said X-ray beam is incident for storing a latent X-ray image produced by said X-ray beam;

a readout system having a source of stimulating radiation for exciting said storage luminescent screen to luminescence, and having a light detector for acquiring light emitted by said storage luminescent screen;

an image playback system supplied with signals representing said light from said detector for converting said signals into a displayable visual image corresponding to said latent X-ray image; and said readout system including a supporting structure having an opening with a rectangular cross-section through which said storage luminescent screen is guided for scanning said storage luminescent screen with said stimulation radiation, said supporting structure having a scanning region containing a plurality of air bearings disposed on opposite sides of said opening for holding said storage luminescent screen in said scanning region, and said radiation source and said light detector being line-shaped and mounted to said supporting structure.

2. An X-ray diagnostic apparatus as claimed in claim 1 wherein said radiation source is mounted to said supporting structure at a first side of said opening and wherein said detector is mounted to said supporting structure at a second side of said opening opposite to said first side.

3. An X-ray diagnostic apparatus as claimed in claim 2 comprising four air bearings, two of said air bearing being disposed on opposite sides of said radiation source and another two of said air bearing being disposed on opposite sides of said light detector.

4. An X-ray diagnostic apparatus as claimed in claim 1 wherein said radiation source is a photodiode array.

5. An X-ray diagnostic apparatus as claimed in claim 1 wherein light detector is a CCD light converter.

6. An X-ray diagnostic apparatus as claimed in claim 1 wherein said supporting structure comprises a bending-resistant frame having said opening therein.

7. An X-ray diagnostic apparatus as claimed in claim 1 wherein said air bearings operate at 5.5 bar excess pressure with gap widths between said bearings of 6±1 $\mu$m.

8. An X-ray diagnostic apparatus as claimed in claim 1 wherein said storage luminescent screen has a width and edges, and wherein the respective air bearings are disposed at a distance from said edges of said storage luminescent screen corresponding to one-fourth of said width of said storage luminescent screen.

9. An X-ray diagnostic apparatus as claimed in claim 1 wherein said storage luminescent screen has a scanning region having a width, and wherein said air bearing are disposed so as to divide said width of said scanning region into three regions of equal size.

10. An X-ray diagnostic apparatus comprising:

an X-ray source which emits an X-ray beam;

a storage luminescent screen on which said X-ray beam is incident for storing a latent X-ray image produced by said X-ray beam;

a readout system having a source of stimulating radiation for exciting said storage luminescent screen to luminescence, and having a light detector for acquiring light emitted by said storage luminescent screen;

an image playback system supplied with signals representing said light from said detector for converting said signals into a displayable visual image corresponding to said latent X-ray image; and said readout system including a supporting structure having an opening with a rectangular cross-section through which said storage luminescent screen is guided for scanning said storage luminescent screen with said stimulation radiation, said supporting structure having a scanning region containing a plurality of air bearings disposed on opposite sides of said opening for holding said storage luminescent screen in said scanning region, and said source of stimulation radiation and said light detector being line-shaped and mounted to said supporting structure for line-by-line scanning of said storage luminescent screen, said plurality of air bearings being disposed to prevent mechanical distortion of said storage luminescent screen while a line thereof is scanned.

11. An X-ray diagnostic apparatus as claimed in claim 10 comprising four air bearings, two of said air bearing being disposed on opposite sides of said radiation source and another two of said air bearing being disposed on opposite sides of said light detector.

12. An X-ray diagnostic apparatus as claimed in claim 10 wherein said radiation source is a photodiode array.

13. An X-ray diagnostic apparatus as claimed in claim 10 wherein light detector is a CCD light converter.

14. An X-ray diagnostic apparatus as claimed in claim 10 wherein said supporting structure comprises a bending-resistant frame having said opening therein.

15. An X-ray diagnostic apparatus as claimed in claim 10 wherein said air bearings operate at 5.5 bar excess pressure with gap widths between said bearings of $6\pm1$ $\mu$m.

16. An X-ray diagnostic apparatus as claimed in claim 10 wherein said storage luminescent screen has a width and edges, and wherein the respective air bearings are disposed at a distance from said edges of said storage luminescent screen corresponding to one-fourth of said width of said storage luminescent screen.

17. An X-ray diagnostic apparatus as claimed in claim 10 wherein said storage luminescent screen has a scanning region having a width, and wherein said air bearing are disposed so as to divide said width of said scanning region into three regions of equal size.

* * * * *